United States Patent [19]

Shirata et al.

[11] Patent Number: 5,077,634
[45] Date of Patent: Dec. 31, 1991

[54] ELECTRIC DOUBLE LAYER CAPACITOR

[75] Inventors: Akihiro Shirata, Yokohama; Ken Kurabayashi, Chigasaki; Yoshinobu Tsuchiya, Fujisawa; Yoriaki Niida, Yamato, all of Japan

[73] Assignee: Isuzu Motors Limited, Tokyo, Japan

[21] Appl. No.: 501,785

[22] Filed: Mar. 30, 1990

[30] Foreign Application Priority Data

Aug. 23, 1989 [JP] Japan .................................. 1-217112
Aug. 23, 1989 [JP] Japan .................................. 1-217113

[51] Int. Cl.$^5$ .............................................. H01G 9/00
[52] U.S. Cl. .................................... 361/502; 29/25.03
[58] Field of Search ............... 361/272, 328, 329, 330, 361/502; 29/25.42, 25.03

[56] References Cited

U.S. PATENT DOCUMENTS 1,862,302  6/1932  Dubilier ............................. 361/328
3,581,158  5/1969  Shirek ............................... 361/330
3,694,709  9/1972  Kind et al. ......................... 361/328
4,683,639  8/1987  Maesaka et al. ................. 361/502 X Primary Examiner—Donald A. Griffin
Attorney, Agent, or Firm—Staas & Halsey

[57] ABSTRACT

An electric double layer capacitor employs a paste electrode between collector electrodes. The paste electrode is compressed under small load because the collector electrodes are pressed by compression plates in only an area corresponding to the past electrode. With the paste electrode thus compressed, the internal resistance of the capacitance is reduced and the capacitance of the capacitor is stable. The electric double layer capacitor comprises a stack of basic cells of capacitor elements. The basic cells are held closely together by a bolt which extends through central holes in the basic cells and interconnects the compression plates, so that the basic cells are compressed under a uniform and appropriate pressure.

9 Claims, 5 Drawing Sheets

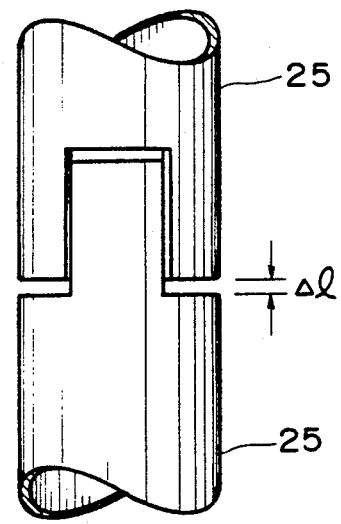
FIG. 3
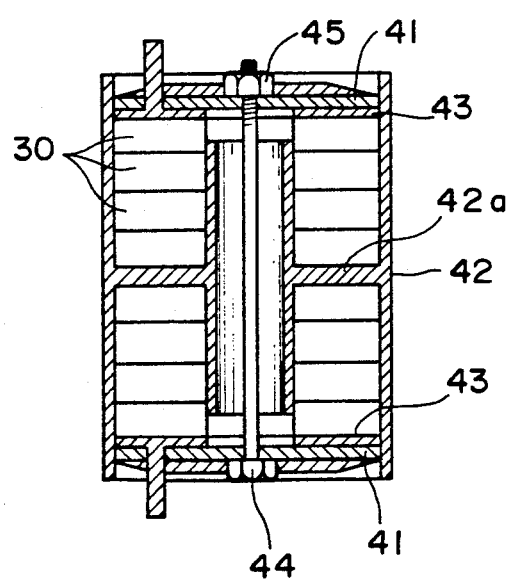
FIG. 4
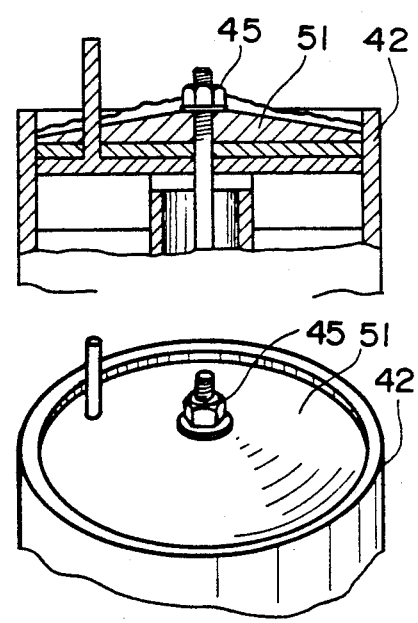
FIG. 5(a)
FIG. 5(b)

ELECTRIC DOUBLE LAYER CAPACITOR

BACKGROUND OF THE INVENTION

1. Field of the Invention

The present invention relates to an electric double layer capacitor which includes a basic cell or a stack of basic cells each having a carbon paste polarized electrode sealed between a pair of collector electrodes and divided into two layers, the polarized electrode being compressed between the collector electrodes from outside thereof.

2. Description of the Prior Art

Motor vehicles powered by internal combustion engines, such as automobiles, have a starter motor for starting the engine, an alternator drivable by the engine for generating electric energy, and a lead storage battery for temporarily storing the electric energy generated by the alternator and for supplying the stored electric energy to the starter motor when the engine is to be started, or to other electric devices.

There has recently been developed a large-capacitance capacitor of the electric double layer type. Some such large-capacitance capacitors can be used as batteries. Japanese Patent Application No. 63(1988)-329846 discloses a motor vehicle power supply device in which such a large-capacitance capacitor is used to start an internal combustion engine.

FIG. 9 of the accompanying drawings shows an electric double layer capacitor having paste electrodes. The illustrated electric double layer capacitor is disclosed in U.S. Pat. No. 3,536,936. The electric double layer capacitor comprises a single basic cell composed of a pair of current collectors 1 made of an electron conductor and which serves as a pair of collector electrodes, a pair of carbon electrodes 2 made of active carbon particles, a pair of nonconductive gaskets 3, and an isolating plate 4 for preventing electrons from moving between the electrodes 2.

The carbon electrodes 2 are made from a concentrated slurry which is a mixture of powdery or particulate active carbon and an electrolyte. The electrolyte has three functions to perform. It serves as an accelerator for ion conduction, an ion source, and a binder for carbon particles.

In order for an electric double layer capacitor to be used as a motor vehicle power supply, it has to have a large capacitance ranging from 100 to 150 F (farads), for example. If the necessary capacitance is to be achieved with an increased number of basic cells, then the capacitor becomes too heavy and bulky to be carried on the motor vehicle. It is necessary to increase the size of a basic cell in order to increase the energy density, i.e., the capacitance per unit volume or the capacitance per unit weight.

If the size of a basic cell is increased, the surface areas of the collector electrodes are also increased. Should different pressures be applied to the central and peripheral regions of the basic cell of increased size, a differential pressure between these different regions is developed. For an electric double layer capacitor to have stable performance as a power supply, it is necessary that the collector electrodes of the stacked basic cells be held in contact under uniform and sufficient adhesive forces.

The internal resistance of an electric double layer capacitor used as a motor vehicle power supply should be as low as possible. The internal resistance of an electric double layer capacitor is greatly affected by the contact resistance of active carbon of the polarized electrodes and the contact resistance between the collector electrodes and the polarized electrodes. Therefore, each basic cell should be kept under vertical pressure in order to reduce the internal resistance of the electric double layer capacitor. Conventional electric double layer capacitors require each cell to be kept under a pressure of about 100 kg/cm$^2$, though it depends on the size of the electrodes, the size of the particles of the carbon material, or the kind of the electrolyte used.

In ordinary electric double layer capacitors, the cells are kept under pressure by staking in order to reduce the internal resistance thereof. A self-supporting capacitor disclosed in Japanese Laid-Open Patent Publication No. 56(1981)-2621, for example, has an encased structure as shown in FIG. 10 of the accompanying drawings. More specifically, the self-supporting capacitor has an outer case 5 housing a first electrode plate 7 from which a first electrode terminal 6 extends vertically upwardly and a second electrode plate 10 from which a second electrode terminal 9 extends vertically upwardly, the second electrode plate 10 lying below the first electrode plate 7 with an insulating plate 8 interposed therebetween. With a certain number of basic cells 12 compressed by a reinforcing plate 11 and accommodated in the outer case 5, the upper peripheral edge of the outer case 5 is bent inwardly down against the first electrode plate 7 by staking near the electrode terminals 6, 9.

The electric double layer capacitor shown in FIG. 10 requires each cell to be kept under a pressure of ranging from 10 to 30 kg/cm$^2$, though it depends on the size of the electrodes, the size of the particles of the carbon material, or the kind of the electrolyte used. If the size of an electric double layer capacitor is so large that its surface area is 100 cm$^2$ or more, then it may be kept under a pressure of several tons or higher.

When an electric double layer capacitor is compressed by staking, the pressure is also imposed on the gasket of each of the cells of the capacitor. Therefore, if the pressure applied to a electric double layer capacitor is to be increased, the thickness of the outer case has to be increased or the rigidity of the capacitor has to be increased by other methods. As a result, the prior electric double layer capacitors cannot be large because there is certain limitation on the overall weight and the cost of materials to be used. Furthermore, there are required a device for compressing the cells and also a device for retaining the cells by staking, and the process of applying a suitable pressure to the cells is complex.

SUMMARY OF THE INVENTION

It is an object of the present invention to provide an electric double layer capacitor which includes a plurality of basic cells or capacitor elements that can easily be compressed.

Another object of the present invention is to provide an electric double layer capacitor in which a stack of basic cells or capacitor elements are compressed uniformly under a pressure that can easily be regulated, and the internal resistance can be reduced with a relatively small force that is effectively utilized.

Still another object of the present invention is to provide an electric double layer capacitor element or cell that may easily be increased in size, and a method of manufacturing such an electric double layer cell.

According to the present invention, there is provided an electric double layer capacitor comprising at least one basic cell which comprises a pair of collector electrodes, the collector electrodes having respective through holes, a polarized electrode having a carbon paste sealed between the collector electrodes, and a separator by which the polarized electrode is divided into two layers, a pair of plates disposed on opposite surfaces of the collector electrodes, respectively, and fastening means interconnecting the plates through the through holes, for thereby compressing the basic cell.

According to one aspect of the invention, the electric double layer comprises a plurality of basic cells stacked together, the plates being disposed on opposite surfaces of the stacked basic cells and interconnected by the fastening means, thereby compressing the stacked basic cells.

Even if the basic cells are large in size, it is possible to reduce the internal resistance thereof by compressing the cells under high pressure. The basic cells are held together by the fastening means at the center thereof. The collector electrodes of the basic cells are therefore held closely against each other, with the result the electric double layer capacitor has a low contact resistance.

According to another aspect of the invention, the plates are held in contact with the opposite surfaces of the collector electrodes in only an area corresponding to the polarized electrode.

Since the basic cells are compressed by the plates which are held in contact with the opposite surfaces of the collector electrodes in only an area corresponding to the polarized electrode, the internal resistance of the cells can be reduced under a small load even if the cells are large in size.

Any desired capacitance can be obtained by a desired number of basic cells stacked together. The fastening means, typically a bolt and a nut, and a collar for use therewith can be varied in length depending on the number of basic cells used. Therefore, the electric double layer capacitor of desired capacitance can be manufactured with ease.

Even if the stacked basic cells have different internal resistances, the total internal resistance of the electric double layer capacitor can easily be adjusted while measuring the internal resistance when the basic cells are tightened together by the fastening means.

Since the maximum compressive distortion of the capacitor is set by the collar, the basic cells will not be broken when the force to tighten the fastening means happens to be excessive.

The capacitor is relatively light in weight because the basic cells, even if they are large, have central through holes.

The electric double layer capacitor of the present invention can be manufactured to have a necessary capacitance when it is used as a power supply in a motor vehicle.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a fragmentary view showing a junction between a pair of electrically insulating collars which cover the outer peripheral surface of a bolt;

FIG. 4 is a cross-sectional view of an electric double layer capacitor according to another embodiment of the present invention;

FIG. 5($a$) is a fragmentary cross-sectional view of an electric double layer capacitor according to a modification of the capacitor shown in FIG. 4;

FIG. 5($b$) is a fragmentary perspective view of the electric double layer capacitor shown in FIG. 5($a$);

DETAILED DESCRIPTION OF THE PREFERRED EMBODIMENTS

Figure 1:
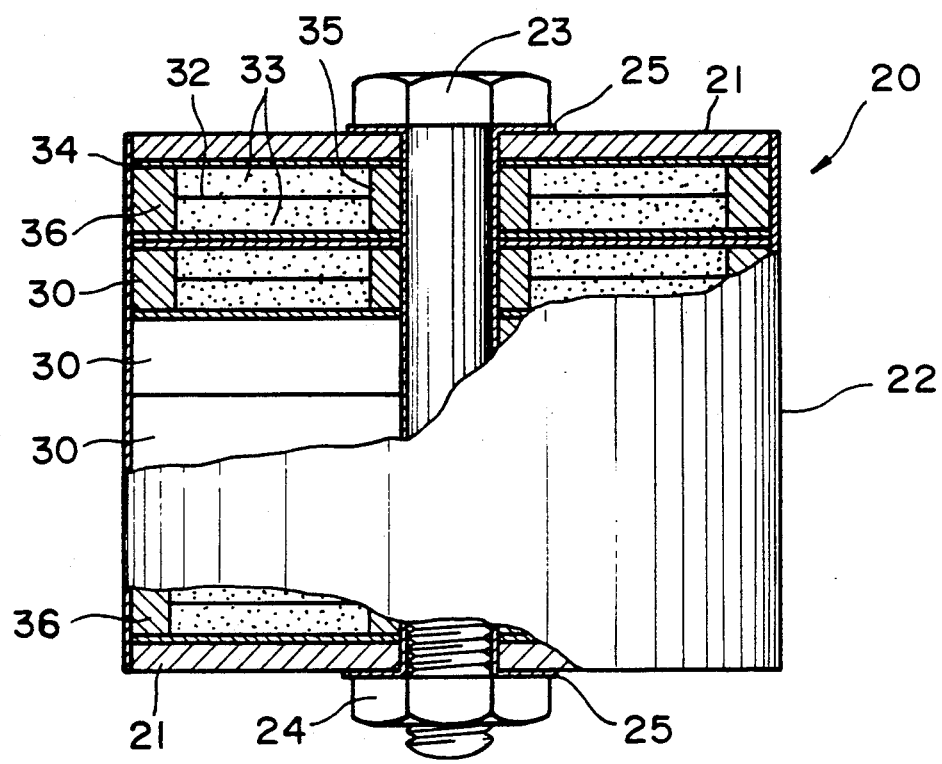
FIG. 1 is a partly cross-sectional view of an electric double layer capacitor according to an embodiment of the present invention.
Figure 2:
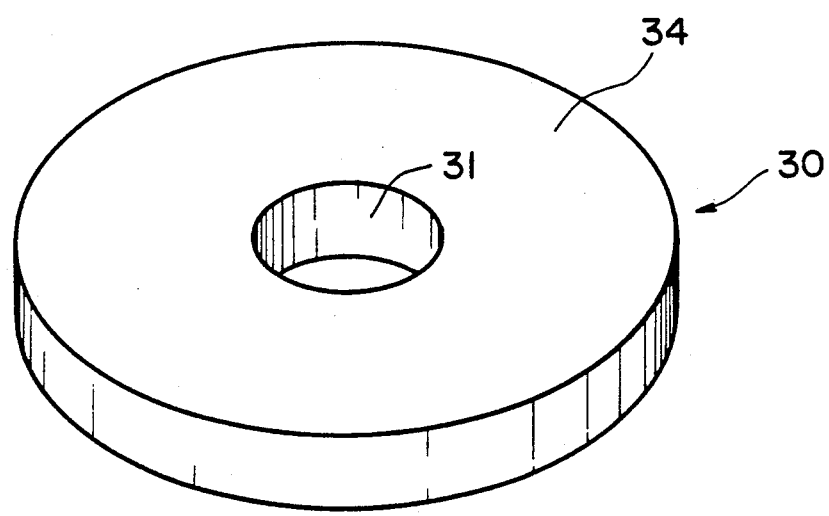
FIG. 2 is a perspective view of a basic cell or capacitor element of the electric double layer capacitor.

As shown in FIGS. 1 and 2, an electric double layer capacitor 20 according to an embodiment of the present invention comprises a stack of basic cells or capacitor elements 30 each in the shape of a circular flat body and having a circular through hole 31 at its center.

Compression plates 21 are disposed on the upper and lower surfaces, respectively, of the cell stack, the compression plates 21 doubling as electrode plates of the capacitor. The stack of basic cells 30 and the compression plates 21 are housed in a cylindrical outer case 22 which are held against the outer peripheral edges of the basic cells 30 and the compression plates 21. Each of the compression plates 21, being a plate for fastening the basic cells 30 in place, is made of a highly rigid metallic material such as stainless steel, and has a circular shape identical to the shape of the basic cells 30. The compression plates 21 have respective through holes corresponding to the through holes 31 in the basic cells 30. A bolt 23 extends through the holes 31 in the basic cells 30 and also the corresponding holes in the compression plates 21. The head of the bolt 23 is held against one of the compression plates 21, whereas a nut 24 is threaded over the tip end of the bolt 23 and held against the other compression plate 21, so that the compression plates 21 are pressed toward each other, holding the basic cells 30 in position therebetween. A collar composed of a pair of collar members 25 made of resin or the like is inserted into the holes 31 from the opposite sides of the capacitor. The collar members 25 electrically isolate the outer peripheral surface of the bolt 23 from the inner peripheral surfaces of the basic cells 30 and the compression plates 21.

Each of the basic cells 30 comprises a polarized electrode 33 made of carbon paste which is separated into two layers by a separator 32, and a pair of collector electrodes 34 between which the polarized electrode 33 is axially sealed. The polarized electrode 33 is also axially sealed by annular gaskets 35, 36 disposed immediately around the hole 31 and along the outer peripheral edges of the collector electrodes 34. The annular gasket 35 which seals the polarized electrode 33 serves to define the circular hole 31 therein, a feature which is different from the conventional electric double layer capacitor cell or element shown in FIG. 9.

The stacked basic cells 30 can easily be compressed when the compression plates 21 and the basic cells 30 are tightened together by the nut 24 on the bolt 23 which extends through the compression plates 21 and the basic cells 30.

FIG. 3 shows a junction between the collar members 25 with a gap or clearance $\Delta l$ left across the junction. More specifically, the collar members 25 are separate from each other in the longitudinal direction of the bolt 23 at an intermediate portion of the bolt 23. The clearance $\Delta l$ between the confronting ends of the collar members 25 corresponds to the maximum compressive distortion or deformation to which the stacked basic cells 30 can be subjected. When the capacitor is assembled, the nut 24 is tightened on the bolt 23 to compress the basic cells 30 to the extent that is allowed by the clearance $\Delta l$ without destruction under compression. In this manner, the internal resistance of the capacitor can easily be adjusted.

FIG. 4 shows an electric double layer capacitor according to another embodiment of the present invention.

According to the embodiment shown in FIG. 4, a stack of basic cells 30 is housed in an outer case 42 of resin, and the outer case 42 has a central partition 42a which is positioned between two groups of the basic cells 30. The basic cells 30 are compressed against the partition 42a by upper and lower compression plates 41 disposed on the opposite sides of the stack of basic cells 30. Conductive plates 43 from which leads extends outwardly are disposed between the compression plates 41 and the basic cells 30. The compression plates 41 are interconnected by a bolt 44 extending through the basic cells 30, with a nut 45 tightened over the bolt 44. The bolt 44 and the nut 45 are insulated when they are encased in molded resin or applied tar, after the capacitor has been assembled.

The leads extending from the respective conductive plates 41 are of the same polarity. The bolt 44 is electrically connected to the basic cells 30 in an intermediate region of the outer case 42, and serves as an electrode lead of the opposite polarity. In use, a plurality of electric double layer capacitors may be connected in series with or parallel to each other by outer cables.

The basic cells 30 which are compressed from their opposite sides toward the central partition 42a of the outer case 42 are held more closely together in their stack than they are in the stack shown in FIG. 1. If the basic cells 30 are larger in size and their collector electrodes have larger surface areas, the capacitance per unit weight can be increased by enlarging the central holes 31 of the basic cells 30. The contact resistance between the collector electrodes is small because any differential pressure thereon is minimized when the nut 45 is tightened on the bolt 44.

FIGS. 5(a) and 5(b) show a modification of the compression plates of the electric double layer capacitor shown in FIG. 4. A modified compression plate 51 has a central area thicker than its peripheral area. The compression plate 51 with such a raised central area allows the basic cells to be compressed more uniformly.

FIGS. 6(a) through 6(e) illustrate successive steps of manufacturing the basic cell or capacitor element 30 shown in FIG. 2.

Figure 6A:
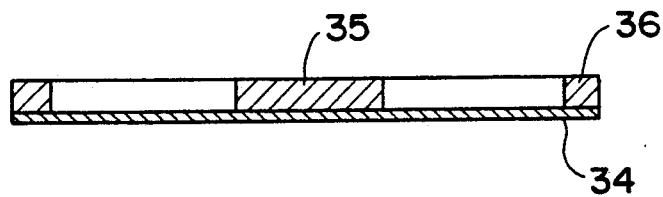
FIGS. 6($a$) through 6($e$) are cross-sectional views showing successive steps of manufacturing the basic cell or capacitor element.
Figure 6B:
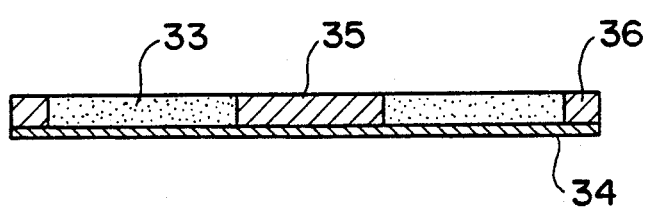
Figure 6C:
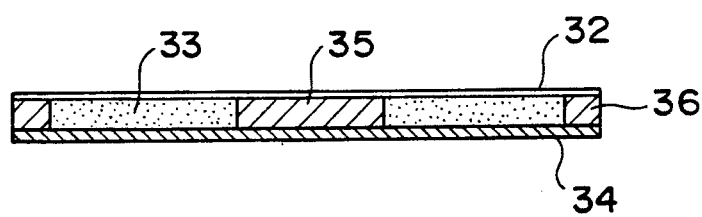
Figure 6D:
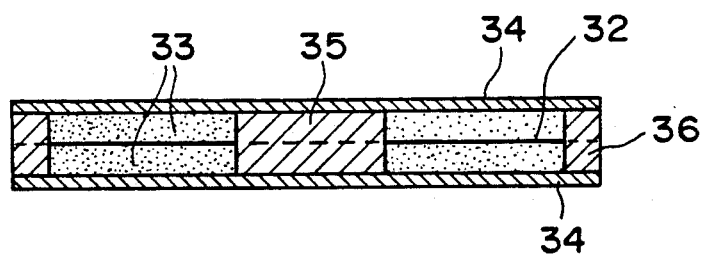
Figure 6E:
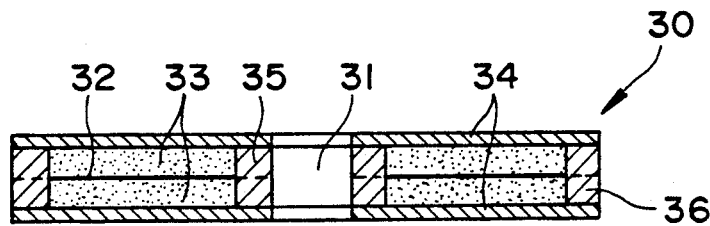

First, gaskets 36, 35 are bonded to outer peripheral and central portions of a disc which will serve as a collector electrode 34, as shown in FIG. 6(a). The gaskets 36, 35 should preferably be made of hard rubber. Then, a carbon paste which will serve as a polarized electrode 33 is filled in the groove or space between the gaskets 35, 36, as shown in FIG. 6(b). The polarized electrode 33 is sealed by an ion-permeable separator 32, as shown in FIG. 6(c). The assembly, and another identical assembly which is prepared in the same manner as described above, except that no separator is provided, are joined together with the separator 32 interposed therebetween, thereby producing a cell blank, as shown in FIG. 6(d). Thereafter, a hole 31 is punched centrally through the collector electrodes 34 and the gasket 35, as shown in FIG. 6(e), whereupon a basic cell 30 is completed.

Figure 8:
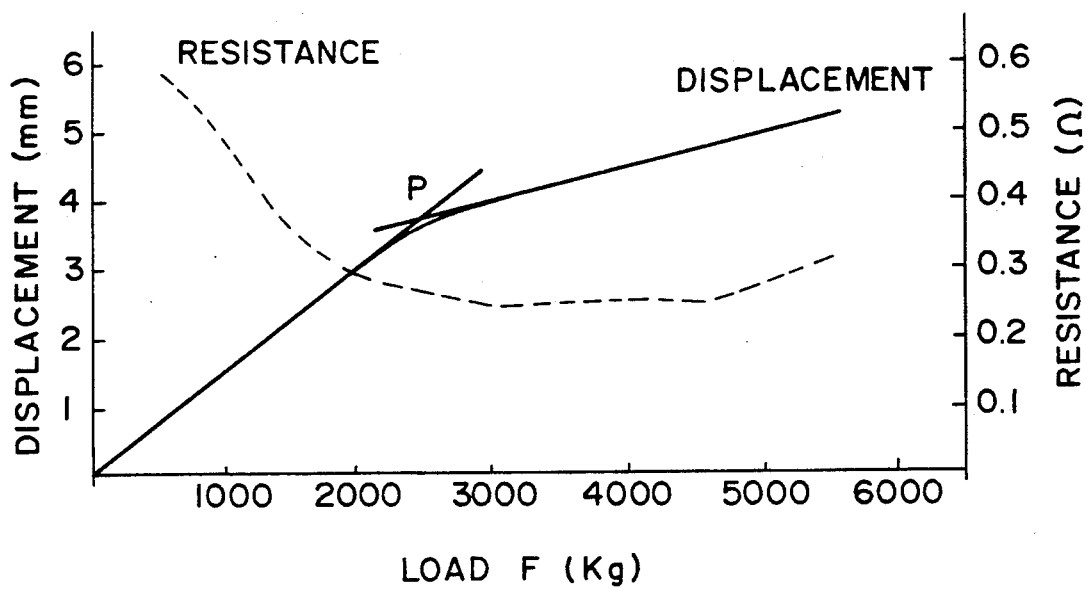
FIG. 8 is a graph showing how the compressive displacement and the resistance of an electric double layer capacitor vary with the load applied thereto.
Figure 9:
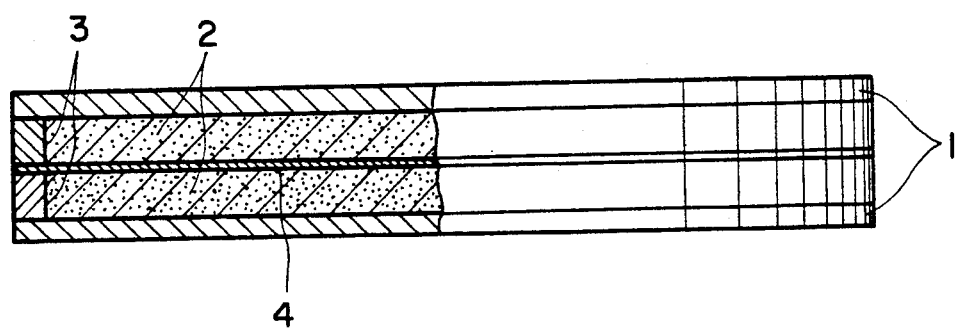
FIG. 9 is a cross-sectional view of a conventional electric double layer capacitor employing paste electrodes.
Figure 10:
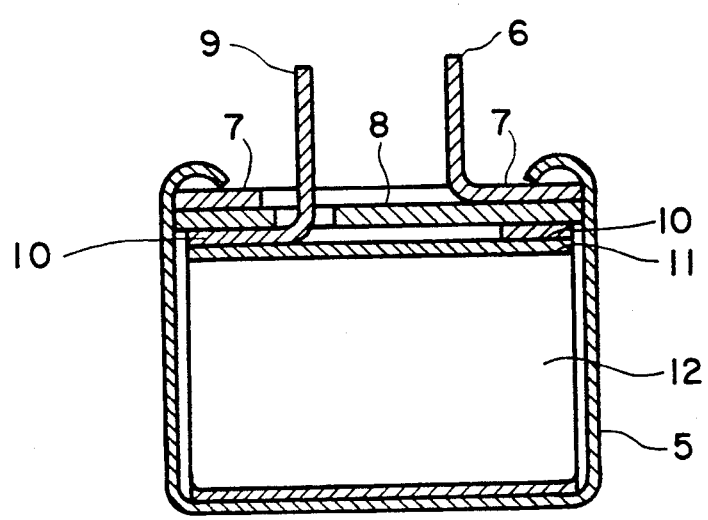
FIG. 10 is a cross-sectional view showing a conventional encased structure of an electric double layer capacitor.

FIG. 8 shows how the compressive displacement and the resistance of an electric double layer capacitor having paste electrodes, as shown in FIG. 9, vary with the load that is applied to the collector electrodes all over their surface.

Each basic cell of the capacitor to which the load F is applied has a thickness of 3.5 mm. The collector electrodes of the basic cell have a surface area of 300 $cm^2$, i.e., are of a rectangular shape which is 20 cm long and 15 cm wide. Values shown in FIG. 8 were obtained when the load F is applied to the capacitor which comprises a stack of fifteen basic cells of such dimensions. The compressive displacement of the capacitor, which is indicated by the solid-line curve, linearly increased as the load F increased up to about 2,400 kg at a point P. After the applied load F increased beyond 2,400 kg, the compressive displacement increased at a lower rate. The resistance of the capacitor, which is indicated by the broken-line curve, was at minimum when the load F was 3,000 kg, which is about 600 kg greater than at the point P, and remained substantially constant after the load further increased.

It should be noted that the experimental results shown in FIG. 8 were obtained when the load was applied also to the gaskets of the basic cells. Generally, the gaskets are made of a nonconductive material such as elastic hard rubber, and the paste electrodes which are sealed by the gaskets are in the form of a mixture of particulate or fibrous active carbon and a solvent such as sulfuric acid. The gaskets and the paste electrodes have different moduli of elasticity. Therefore, the load F is first borne by the gaskets, and then applied to the paste electrodes, which are porous and have a smaller bulk density, essentially after the point P.

The results shown FIG. 8 indicate that the load of 3,000 kg or more is required to compress the entire basic cell including the gaskets, as is the case with the conventional electric double layer capacitor, and only the load of 600 kg, which is one fifth of 3,000 kg, is required to compress only the paste electrodes.

Figure 7:
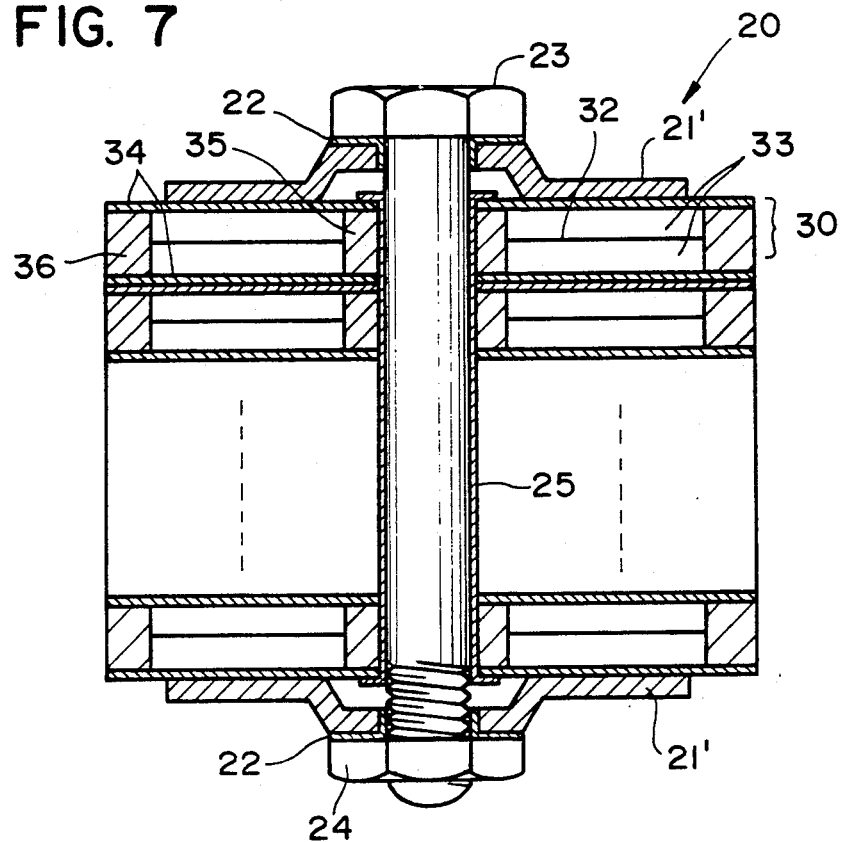
FIG. 7 is a cross-sectional view of an electric double layer capacitor according to still another embodiment of the present invention.

FIG. 7 shows an electric double layer capacitor according to still another embodiment of the present invention. Those parts shown in FIG. 7 which are identical to those shown in FIG. 1 are designated by identical reference numerals.

As with the electric double layer capacitor 20 shown in FIG. 1, an electric double layer capacitor 20 shown in FIG. 7 comprises a stack of basic cells or capacitor elements 30 each in the shape of a circular flat body and having a circular through hole 31 at its center. Each of the basic cells 30 comprises a polarized electrode 33 of carbon paste which is separated into two layers by a separator 32, and a pair of collector electrodes 34 between which the polarized electrode 33 is axially sealed. The polarized electrode 33 is also axially sealed by annular gaskets 35, 36 disposed immediately around the hole 31 and along the outer peripheral edges of the collector electrodes 34.

Compression plates 21' are disposed on the upper and lower surfaces, respectively, of the cell stack, the compression plates 21' doubling as electrode plates of the capacitor. Each of the compression plates 21', being a plate for fastening the basic cells 30 in place, is made of a highly rigid metallic material such as stainless steel, and has a circular shape large enough to compress the polarized electrode 33 of each basic cell 30. Each compression plate 21' has a raised central area and is held in contact with one of the collector electrodes 34 of one of the basic cells 30. The raised central areas of the compression plates 21' have respective through holes corresponding to the through holes 31 in the basic cells 30. Collars 22 are fitted in the holes in the compression plates 21' and a collar 25 is fitted in the holes 31 in the basic cells 30. A bolt 23 extends through the collars 22, 25, and has a head held against one of the compression plates 21', whereas a nut 24 is threaded over the tip end of the bolt 23 and held against the other compression plate 21', so that the compression plates 21' are pressed toward each other, holding the basic cells 30 in position therebetween.

The stacked basic cells 30 can easily be compressed when the compression plates 21' and the basic cells 30 are tightened together by the nut 24 on the bolt 23 which extends through the compression plates 21' and the basic cells 30. The compression plates 21' do not apply a load to the gaskets 35, 36 of the basic cells 30, but compress only the polarized electrodes 33 of the basic cells 30. Therefore, the internal resistance of the capacitor is reduced under a small load, while the basic cells 30 are held together stably.

Although certain preferred embodiments have been shown and described, it should be understood that many changes and modifications may be made therein without departing from the scope of the appended claims.

What is claimed is:

1. An electric double layer capacitor comprising:
   at least one basic cell which comprises:
   a pair of collector electrodes, said collector electrodes having respective through holes;
   a polarized electrode including a carbon paste sealed between said collector electrodes; and
   a separator by which said polarized electrode is divided into two layers;
   a pair of plates disposed on opposite surfaces of said collector electrodes, respectively; and
   fastening means for interconnecting said plates through said through holes, thereby compressing said basic cell.

2. An electric double layer capacitor according to claim 1, comprising a plurality of basic cells stacked together, said plates being disposed on opposite surfaces of the stacked basic cells and interconnected by said fastening means, thereby compressing said stacked basic cells.

3. An electric double layer capacitor according to claim 2, wherein said fastening means comprises a bolt extending from one of said plates through said through holes to the other of said plates, and a nut threaded over said bolt.

4. An electric double layer capacitor according to claim 3 further including an electrically insulating collar covering an outer peripheral surface of said bolt.

5. An electric double layer capacitor according to claim 4, wherein said collar comprises two collar members which are separate in the longitudinal direction of said bolt, with a clearance left between said collar members, said clearance corresponding to a maximum compressive distortion of the stacked basic cells.

6. An electric double layer capacitor according to claim 2, wherein said plates are held in contact with the opposite surfaces of the collector electrodes in only an area corresponding to said polarized electrode.

7. An electric double layer capacitor according to claim 1, wherein said plates are held in contact with the opposite surfaces of the collector electrodes in only an area corresponding to said polarized electrode.

8. An electric double layer capacitor according to claim 1, wherein said polarized electrode has a through hole defined therein, said basic cell further comprising gaskets disposed around said through hole in said polarized electrode and along an outer periphery of said collector electrodes and sealing said polarized electrode therebetween.

9. A method of manufacturing an electric double layer capacitor cell, comprising the steps of:
   bonding gaskets to a plate as a collector electrode at outer peripheral and central portions thereof;
   filling a carbon paste as a polarized electrode in a groove defined between said gaskets, thereby producing an assembly;
   joining two assemblies to each other with a separator interposed therebetween; and
   defining a through hole centrally in the collector electrodes and the gaskets at the central portions thereof.

* * * * *